J. F. LAMB.
PERCOLATOR.
APPLICATION FILED FEB. 21, 1912.
1,051,421.
Patented Jan. 28, 1913.
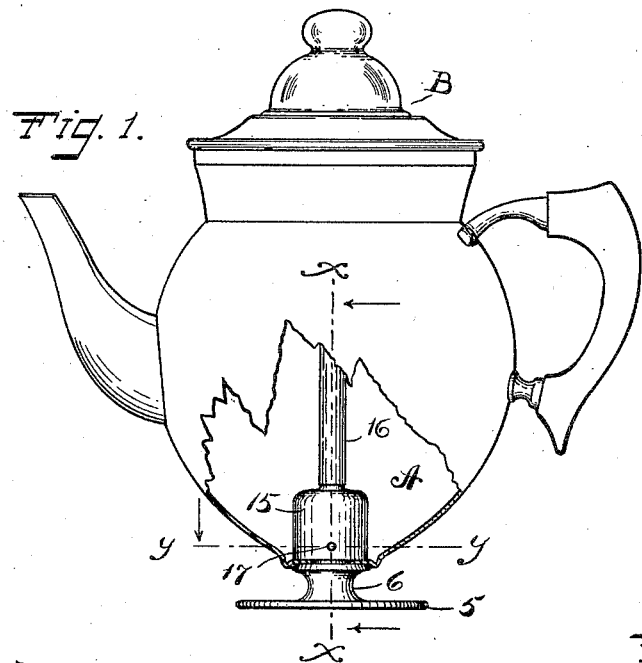
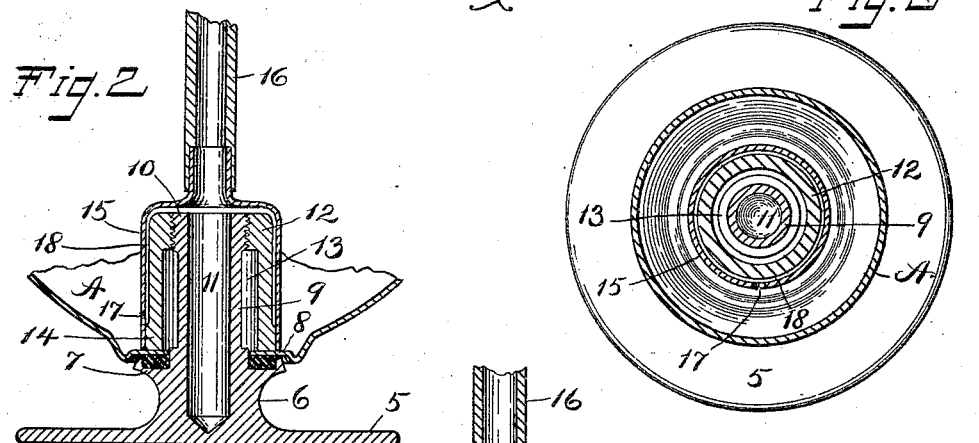
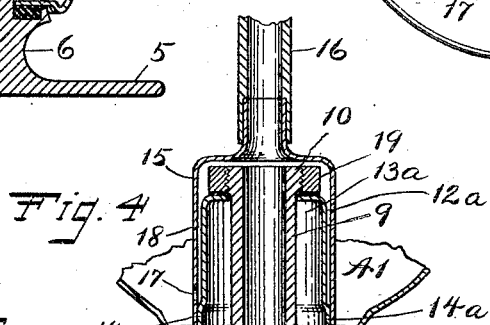
Witnesses
S. H. Clarke
Roger Edwards
Inventor
Joseph F. Lamb.
By Louis W. Schmidt
Atty.

UNITED STATES PATENT OFFICE.

JOSEPH F. LAMB, OF NEW BRITAIN, CONNECTICUT, ASSIGNOR TO LANDERS, FRARY AND CLARK, OF NEW BRITAIN, CONNECTICUT, A CORPORATION.

PERCOLATOR.

1,051,421.  Specification of Letters Patent.  Patented Jan. 28, 1913.

Application filed February 21, 1912. Serial No. 678,981.

*To all whom it may concern:*

Be it known that I, JOSEPH F. LAMB, a citizen of the United States, residing at New Britain, in the county of Hartford and State of Connecticut, have invented certain new and useful Improvements in Percolators, of which the following is a specification.

My invention relates to improvements in percolators and the main object of my improvement is to improve the efficiency of the fountain.

In the accompanying drawing:—Figure 1 is a broken out side elevation of my percolator. Fig. 2 is a central vertical section of the lower part of the same, on the line $x\ x$ of Fig. 1 and on an enlarged scale. Fig. 3 is a horizontal section of the same on the line $y\ y$ of Fig. 1, and Fig. 4 is a central vertical section of the lower part of the same in a modified form.

The body A of the vessel, its cover B and the internal parts at the upper part, not shown, may be of any ordinary construction.

5 designates a flat base adapted to be placed upon a stove or other heater. At the top or upper part of its neck 6 is a recessed shoulder 7 to form a seat for an asbestos washer 8 or other non-conductor packing to rest upon. From this seat there is a tubular extension 9 having an exteriorly threaded portion 10 at its upper end. The bore 11 of this tubular extension extends well down into the base, as in ordinary percolators.

12 designates a nut threaded at its upper end to fit the exteriorly threaded portion 10 on the upper end of the tubular extension. The lower part of the nut is chambered out to form an annular wall with an air tight chamber 13 between the body of the tubular extension 9 and interior wall of the lower part of the said nut. The tubular extension 9 is extended up through the bottom of the vessel A which rests upon the asbestos washer 8 before the nut is screwed on. Then the nut is put in place and screwed down with its end pressing the bottom of the vessel on the top of the asbestos washer 8. Near the lower end of the nut 12 there is an enlarged portion 14 to receive and fit the lower end of the enlarged base 15 of the fountain tube 16 which extends up to the top of the percolator in the ordinary manner, the said base 15 being perforated as at 17 to permit the fluid in the percolator to pass inwardly into the fountain tube and into the bore 11 of the tubular extension of the base. This construction of the nut and base 15 of the fountain tube forms an annular chamber 18 between the said base and the exterior of the nut for the liquid to pass through.

In the modification shown in Fig. 4, the flat base 5, shouldered neck 6, asbestos washer 8, tubular extension 9, its threaded upper end 10 and the bore 11 are the same as hereinbefore described but instead of an inverted cup shaped nut I form a dome $12^a$, integral with the bottom of the vessel $A^1$, the said dome having an enlarged portion $14^a$ to fit and receive the base 15 of the fountain tube 16, the same as it fits the exterior of the nut in the construction first described. The vessel $A^1$ with its dome is placed upon the base 5 and shouldered neck, the upper end of the tubular extension of which neck extends through the bottom of the vessel at the top of the dome. The parts are then secured in place by an ordinary nut 19 screwed upon the upper end of the tubular portion 9, thereby forming an air chamber $13^a$ between the interior of the dome and outer wall of the tubular portion 9.

In both constructions the same base and integral parts are employed. There is in both a fastening device on the upper end of the tubular extension of the base and extending downwardly from the said device there is a surrounding wall with an air space or chamber between the inner surface of that wall and the exterior surface of the inclosed tubular extension.

The general operation is the same as in ordinary percolators. By the construction and arrangement hereinbefore described the heat is conducted from the base up through the neck and tubular extension to the upper end thereof before it is conducted to the body of the vessel or the liquid in the main body thereof, whereby the fountain will start quicker and work faster than it would if the asbestos packing and air space were not present.

I claim as my invention:—

1. In a percolator, a base provided with a shouldered neck and tubular extension, a vessel apertured at its bottom part and seated on the said shouldered neck, an inclosing wall surrounding the body portion of the said tubular extension for forming an inclosed air chamber between the said wall and exterior of the said tubular extension and a fountain tube and base surrounding the said inclosing wall with an annular liquid chamber surrounding the said inclosed air chamber the said base and vessel being secured together.

2. In a percolator, a base provided with a shouldered neck and tubular extension exteriorly threaded at its upper end, an apertured vessel seated on the said shouldered neck, an inclosing wall surrounding the body portion of the said tubular extension and spaced from the said body to provide an air chamber between the said tubular extension and the said inclosing wall and a binding nut screwed on the upper end of the said tubular extension for fastening the vessel and the base together.

3. In a percolator, a base provided with a shouldered neck and tubular extension exteriorly threaded at its upper end, an apertured vessel seated upon the said shouldered neck, a binding nut screwed on the upper end of the said tubular extension, and an inclosing wall extending downwardly from the said nut to the bottom of the pot adjacent to the seat on the shouldered neck, for forming an air tight annular chamber between the said wall and exterior of the said tubular extension, and for binding the vessel to its seat and fastening the said base and vessel together through the said wall.

JOSEPH F. LAMB.

Witnesses:
H. W. Traver,
C. E. Crane.

---

Copies of this patent may be obtained for five cents each, by addressing the "Commissioner of Patents, Washington, D. C."